Patented Sept. 18, 1923.

1,468,618

UNITED STATES PATENT OFFICE.

UMETARO SUZUKI, OF TOKYO, JAPAN.

SODIUM COMPOUND OF DIOXYDIAMINOARSENOBENZENE AND PROCESS OF MAKING THE SAME.

No Drawing. Original application filed June 7, 1916, Serial No. 102,317. Divided and this application filed February 26, 1918. Serial No. 219,250.

*To all whom it may concern:*

Be it known that I, UMETARO SUZUKI, a subject of the Emperor of Japan, residing at Tokyo, Japan, have made a certain new and useful Invention in Sodium Compound of Dioxydiaminoarsenobenzene and Process of Making the Same, of which the following is a specification.

This invention relates to sodium compounds from dioxydiaminoarsenobenzol hydrochlorid, and particularly to subject matter divided from my co-pending application Serial No. 102,317, filed June 7, 1916, now Patent No. 1,330,288, of February 10, 1920.

The object of the invention is to improve the commercial form of salts, bases, or compounds of aminooxyarsenobenzene, or other derivatives of oxyarylarsinic acids in order to remove the danger and disadvantages attending the use of the same.

The dihydrochloride derivative of aminooxyarsenobenzene,

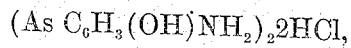
$(As\ C_6H_3(OH)NH_2)_2 2HCl$, is acid in reaction and cannot be used in its original form. It has been a common practice to treat the dihydrochloride with an alkali. This necessitates great caution since an excessive as well as an insufficient quantity of alkali employed causes pain to patients using the same besides renders the compound harmful. Moreover, the commercial form of the dihydrochloride compound referred to, or its derivatives, when treated with an alkali for practical use, is subject to rapid oxidation which converts it into a strong poison. This defect requires that the compound be treated with an alkali only at the time of use of the compound and immediately before such use in order to avoid the serious poisoning effects due to the partial oxidation of the dihydrochloride compound.

It is among the special objects of the present invention to avoid these and other objections, and to provide a product from the dihydrochloride, or a compound from the same, and a method of preparing it, in which the dangers noted are avoided, and wherein the compound can be preserved in a form ready for use, and which possesses the healing or therapeutic value of the original product.

In carrying out my invention I produce a sodium compound in the form of an amorphous yellowish brown powder, soluble in water, or in physiological salt solution, with a resulting light yellow color, and having a slightly alkaline reaction. The compound expressed by the formula $C_{12}H_{10}As_2N_2O_2Na_2$ is soluble in methyl alcohol, but is nearly insoluble in ether, petroleum ether, ethyl alcohol, and acetone. Not being an acid the compound does not require neutralization, but can be used directly, and dissolved in water or physiological salt solution, as an injection, and can be preserved indefinitely in dry powdered form without danger of oxidation and consequent formation of noxious or poisonous substances.

In carrying out my invention the dioxydiaminoarsenobenzene, or derivative thereof as the dihydrochloride, expressed in the first chemical formula above given, say, for example, five grams is moistened with alcohol, say 5 c. c., and dissolved in methyl alcohol, for example, 40 to 50 c. c. To the resulting clear yellow methyl alcohol solution of the dihydrochloride is added sodium ethylate solution (which may be prepared, for example, by dissolving 4 grams of metallic sodium in 100 c. c. of absolute ethyl alcohol) to the extent, in the example stated, of 24 to 25 c. c. A thick brownish yellow precipitate is produced which partly dissolves again by the addition of a further quantity of sodium ethylate. In order to ascertain whether or not a sufficient quantity of the sodium ethylate has been used a few drops of the solution are added to three to five c. c. of water. If the solution does not dissolve quite clear a little more of the sodium ethylate is added to the methyl alcohol solution of the dihydrochloride. Excess of the sodium ethylate must be avoided. The solution is then precipitated with ether, for example, 500 c. c., to which is added ethyl alcohol, say 30 to 50 c. c. The resulting yellowish brown precipitate is collected and removed by filtration, or otherwise, is washed with ether and suitably dried. The yield of the sodium compound thus obtained, employing the quantities of materials given in the above example, is from five to six grams.

Having now set forth the object and nature of my invention, what I claim as new and useful, and of my own invention, and desire to secure by Letters Patent, is,—

1. The process of manufacturing sodium compounds from dioxydiaminoarsenobenzene hydrochloride which consists in mixing a methyl alcohol solution of such hydrochloride with sodium ethylate.

2. The process of making the herein described sodium compound from a dihydrochlorid derivative of aminooxyarsenobenzene, which consists in dissolving said dihydrochlorid with methyl alcohol to a clear yellowish solution, then treating said solution with sodium ethylate to form the sodium compound and finally isolating said compound.

3. As an article of manufacture, a sodium compound obtained by the process of claim 1 as a yellowish brown powder from the herein described dihydrochlorid derivative, and characterized by its stability and high non-oxidizing qualities, its water solubility and slightly alkaline reaction.

In testimony whereof I have hereunto set my hand on this twenty sixth day of January, A. D., 1918.

UMETARO SUZUKI.